May 9, 1961 L. M. FIELD 2,983,839

RADIO FREQUENCY SPECTRUM ANALYZERS

Filed Dec. 18, 1951 3 Sheets-Sheet 1

INVENTOR
LESTER M. FIELD
BY Paul B. Hunter
ATTORNEY

RADIO FREQUENCY SPECTRUM ANALYZERS
Filed Dec. 18, 1951 3 Sheets-Sheet 2
Fig. 7.
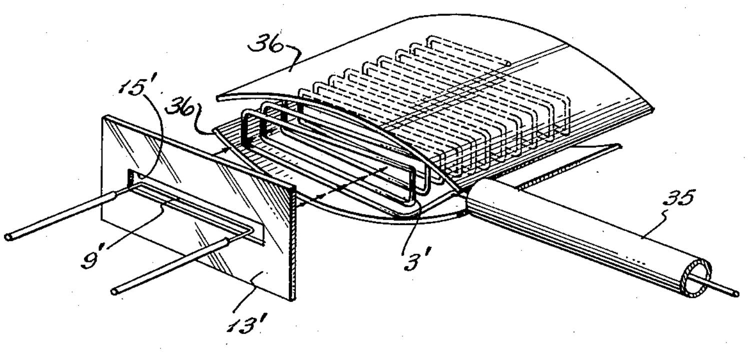
Fig. 8.
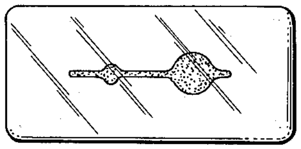
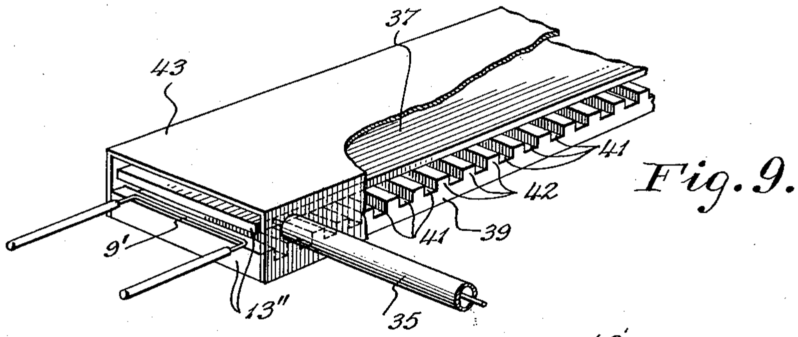
Fig. 9.
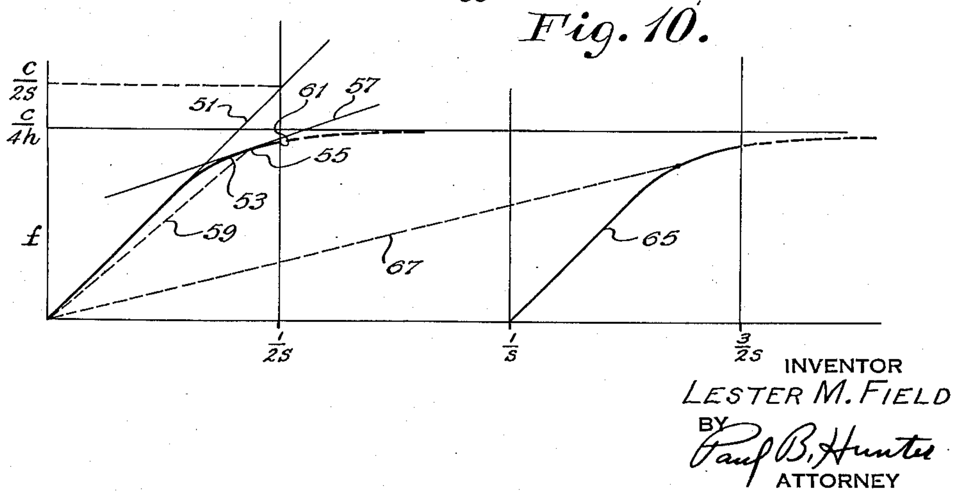
INVENTOR
LESTER M. FIELD
BY Paul B. Hunter
ATTORNEY May 9, 1961 L. M. FIELD 2,983,839

RADIO FREQUENCY SPECTRUM ANALYZERS

Filed Dec. 18, 1951 3 Sheets-Sheet 3

INVENTOR
LESTER M. FIELD
BY Paul B. Hunter
ATTORNEY

United States Patent Office 2,983,839

Patented May 9, 1961

2,983,839

RADIO FREQUENCY SPECTRUM ANALYZERS

Lester M. Field, Palo Alto, Calif., assignor to The Board of Trustees of the Leland Stanford Junior University, Stanford University, Calif., a legal entity having corporate powers Filed Dec. 18, 1951, Ser. No. 262,311

11 Claims. (Cl. 315—3.5)

This invention relates to improvements in radio spectrum analyzers or panoramic receivers for detecting the presence of radio signals within a given band of frequencies, and indicating the frequencies and approximate amplitudes of such signals. The present invention is directed principally to spectrum analyzers for microwave frequencies, up to several thousand megacycles per second.

Prior art radio spectrum analyzer systems have involved the use of a calibrated receiver which could be tuned slowly over its band, producing output briefly as it is tuned past the frequency of each signal in the band. Such receivers can be made to scan continuously, with the output displayed on a cathode ray oscilloscope swept in synchronism with the frequency variation to give a graphic indication of signal frequencies and relative amplitudes.

The resolution of scanning analyzers, i.e. the minimum amount by which two signals must differ in frequency in order to be distinguishable, is proportional to the square root of the scanning rate in cycles per second. Thus if a wide band is to be covered at frequent intervals, resolution must be sacrificed. This limitation becomes a serious problem when it is desired to operate with pulsed signals of brief duration, such as radar signals. For example, a scanning analyzer designed to detect all radar pulses received within a given frequency range would require a sweep period of about one-tenth microsecond. If the range to be covered were 1000 megacycles wide the resolution bandwidth would be about 130 megacycles, which is so much that signals from different transmitters might easily be confused.

One of the principal objects of the present invention is to provide microwave radio spectrum analyzers which do not scan at all, but respond substantially instantaneously to any received signals whose frequencies are within the acceptance band, regardless of when they occur or what their frequencies are.

Another object is to provide non-scanning spectrum analyzers which will accept and respond to signals of any frequency throughout an extremely wide band.

A further object of this invention is to provide radio spectrum analyzers whose resolution is not fundamentally limited by the width of the band to be covered or the nature of the signals to be detected.

Another object is to provide spectrum analyzers which will respond simultaneously to each of a plurality of simultaneous signals substantially without regard to the presence of the others.

The invention will be described with reference to the accompanying drawings, wherein.

Figure 1:
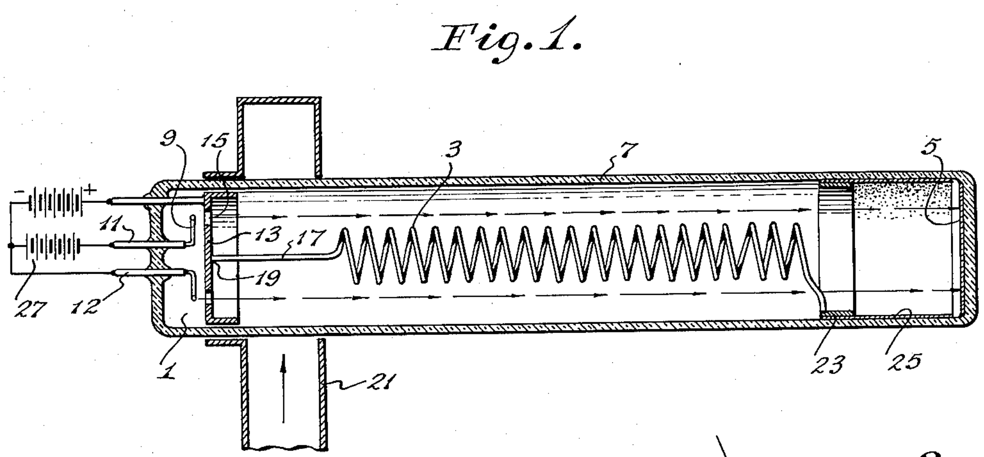
Fig. 1 is a longitudinal section of a device embodying the invention.
Figure 3:
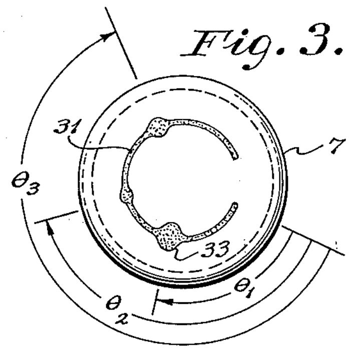
Figure 4:
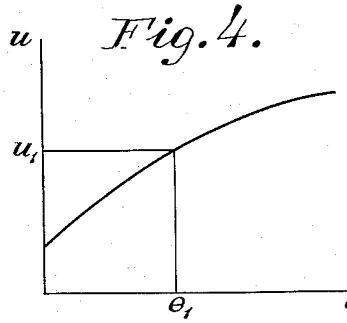
Figure 5:
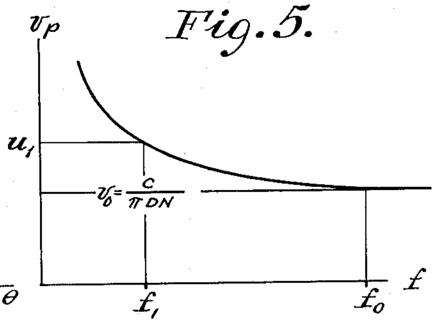
Figure 6:
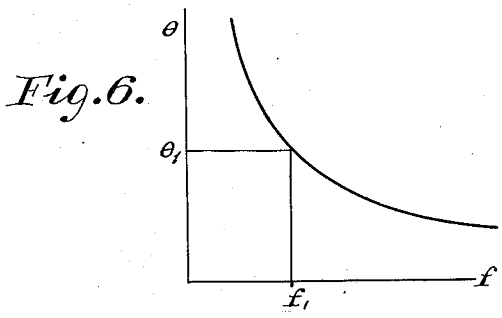
Figure 11:
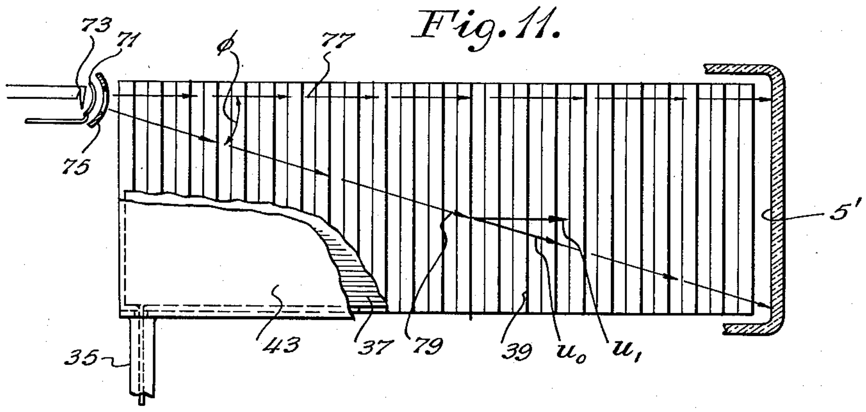

Figs. 3, 4 and 5 are graphs illustrating the principles of operation of the device of Fig. 1, Fig. 6 is an illustration of a typical indication produced by the device of Fig. 1, Fig. 7 is a perspective view of a portion of a modification of the structure of Fig. 1, Fig. 8 illustrates the type of indication produced by the arrangement of Fig. 7, Fig. 9 is a perspective view of a further modification, Fig. 10 is a graph illustrating the principle of space harmonic operation of a wave propagating structure like that of Fig. 9, Fig. 11 is a plan view of a modification of the device shown in Fig. 9, and Figs. 12, 13 and 14 are views in plan, longitudinal section, and transverse section respectively of a further modification of the invention.

Referring to Fig. 1, an electron gun 1 is arranged to produce a hollow tubular stream of electrons, and direct the stream along a conductive helix 3 to a target 5. The elements 1, 3 and 5 are enclosed in an evacuated envelope 7 of glass or similar material. The target 5 comprises a coating of fluorescent material such as one of the phosphors commonly used for the screens of cathode ray oscilloscope tubes.

The electron gun 1 includes a filamentary cathode 9 arranged in the form of a circle, except for a small arc to accommodate the terminal leads 11 and 12 extending through seals in the envelope 7. The filament 9 may be a fine wire of some high resistance material such as tungsten, in order to have a high voltage drop, perhaps 100 volts or more, under operating conditions. Near the cathode, and spaced from it in the direction of the helix, is an accelerating electrode 13 provided with an arcuate slot 15 corresponding in outline to the filament 9. The electron gun may, if desired, include other electrodes (not shown in Fig. 1) of conventional design to assist in focussing the electron beam.

The helix conductor is extended near one end to provide a short lineal portion 17 which is connected at the point 19 to the accelerator electrode 13. The member 17 serves to couple the helix to a wave guide 21 which is provided with openings in its walls so as to extend over and surround the envelope 7 as shown. The end of the helix remote from the electron gun is terminated by connection through a conductive ring 23 to a coating 25 of conductive material such as carbon on the inside of the envelope 7.

A helix like that of Fig. 1 has the characteristic of carrying electromagnetic waves with velocities which are low with respect to the velocity of wave propagation in free space. When the free space wavelength is short, say less than fifty times the helix diameter in a typical case, the wave travels along the helix wire at very nearly the free space velocity, and thus the axial component of velocity, i.e. the velocity of propagation longitudinally along the helix, depends upon the pitch and diameter of the helix substantially as follows:

$$v_o=\frac{c}{\pi DN}$$

where $v_o$ is the axial velocity of propagation, $c$ is the free space velocity, D is the diameter and N is the number of turns per unit length, in the same units as the diameter.

The velocity is substantially independent of frequency throughout a wide range of frequencies, and it is this characteristic which makes helices useful as slow wave propagating structures in broad band travelling wave amplifiers. The term "slow wave propagating structure" as used herein is intended to mean generically any device which carries electromagnetic waves with a phase velocity which is low, say less than about one quarter the velocity of light.

At frequencies below the range where the velocity is substantially constant, the helix becomes "dispersive,"

i.e. the velocity varies as a function of frequency. Fig. 5 shows the velocity $v_p$ of waves on a helix as a function of frequency $f$. At frequencies above $f_0$, the velocity is constant at $v_0$. As the frequency is lowered below $f_0$, the velocity increases more and more rapidly. In a typical helix, with pitch and diameter designed to make $v_0$ about one thirtieth the velocity of light, $f_0$ is approximately 0.8 divided by D, where D is in centimeters and $f_0$ is in thousands of megacycles per second. Thus, if the diameter of the helix were one centimeter, $f_0$ would be 800 megacycles per second. At 400 megacycles, the velocity would be about one twenty fifth the velocity of light.

The helix 3 in the device of Fig. 1 is designed to be dispersive throughout the range of frequencies to be indicated, while keeping the maximum value of $v_p$ in this range low enough to permit elections to be accelerated to that velocity with conveniently attainable voltages. For example, the above described helix might be used over the range of 400 to 800 megacycles, corresponding to velocities from one twenty fifth to one thirtieth that of light, and acceleration voltages of 400 to 275 volts.

Figure 2:
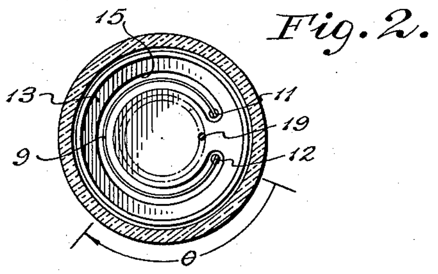
Fig. 2 is a transverse section of the structure of Fig. 1.

With these conditions, the filament 9 is designed to operate at 125 volts, which is supplied from a D.-C. source such as a battery 27. The accelerator electrode 13 is connected to a D.-C. source 29 which, with the connections as shown, should have a potential of 275 volts. The difference in potential between the electrode 13 and any given point on the filament 9 is the acceleration potential for electrons emitted from that point. This difference varies linearly from a minimum of 275 volts at the terminal 12 to a maximum of 400 volts at the terminal 11. Since the velocity $u$ attained by an electron is proportional to the square root of the accelerating potential to which it is subjected, the velocity of each longitudinal element of the electron stream will be a function of its angular position $\theta$ measured from the terminal 12 as shown in Fig. 2. The relationship between $u$ and $\theta$ is illustrated by the graph of Fig. 4.

The input wave guide 21 is coupled to an external source, not shown, of signals whose frequencies are to be indicated, for example an antenna. The input coupling means may include a broad-band amplifier such as a conventional travelling wave tube for intensification of weak signals before they are applied to the wave guide 21.

The applied signals set up waves travelling along the helix at velocities which depend upon their respective frequencies in the manner indicated in Fig. 5. Consider a wave of frequency $f_1$, having a phase velocity $v_1$. At some angle $\theta_1$ around the periphery of the helix, the electrons in the stream will have a velocity $u_1$ substantially equal to the wave velocity $v_1$. Each electron in this lineal element of the electron stream will be subject to a unidirectional radial electric field during its travel along the helix, because it is moving in synchronism with the wave. Some of the electrons will be deflected outwardly, some will be deflected inwardly, and some will not be deflected at all, depending upon their respective positional relationships with the travelling wave. Accordingly this particular element of the beam is spread out radially, by an amount which depends upon the amplitude of the input signal. The wave may also be amplified to some degree by this action, in a manner similar to the action of a travelling wave amplifier. Such amplification will simply increase the deflection by a corresponding amount.

Referring to Fig. 3, which represents an end view of the device of Fig. 1, facing the fluorescent screen 5, the electron beam produces a generally circular luminous trace 31, corresponding in outline to the filament 9. In the absence of signals, the trace would be of substantially uniform radial width. Owing to the described radial deflection of the electrons of synchronous velocity, the trace 31 is widened at the angle $\theta_1$, as indicated at the point 33. Similarly, input signals of frequencies $f_2$ and $f_3$ will make corresponding indications at angles $\theta_2$ and $\theta_3$. All such indications are produced independently of each other and may be simultaneous. The graph of Fig. 6 shows the relationship between frequency and the angle $\theta$, corresponding to the characteristics represented by Figs. 4 and 5.

Fig. 7 shows the essential details of a modification of the device of Fig. 1 to provide a straight-line, instead of a circular trace. Here the filament 9' is straight, and the accelerator electrode 13' has a narrow slit 15' of corresponding shape. The helix 3' is of flattened cross section as shown, and the ribbon shaped electron beam produced by the gun elements 9' and 13' flows inside the helix. The fluorescent screen, not shown in Fig. 7, may be of oblong shape corresponding to that of the desired display, as indicated in Fig. 8.

Input signals are applied by way of a coaxial line 35. The inner conductor of the line is connected directly to the end of the helix 3', and the outer conductor is connected to the edges of a pair of conductive plates 36 disposed respectively above and below the broad sides of the helix. The plates 36 may extend over the whole length of the helix, but need only cover the first few turns. This arrangement provides a substantially smooth electrical transition from the radial electric mode of propagation in the line 35 to the longitudinal mode of the helix.

The operation of the device of Fig. 7 is substantially like that of Fig. 1. The electric fields inside the helix are such as to deflect synchronous electrons up or down, i.e. perpendicular to the plane of the beam, making the beam thicker at points along its width where the electron velocities correspond to the wave velocities. Fig. 8 shows a typical indication of two signals differing both in frequency and amplitude.

A further modification is illustrated in Fig. 9, where the flat helix of Fig. 8 is replaced by a periodically loaded wave guide or parallel-plate transmission line. The ribbon-like electron stream from the filament 9 in this instance flows between upper and lower conductive plates 37 and 39 respectively. The function of the accelerator electrode 13' of Fig. 8 may be performed by the end surfaces 13'' of the plates 37 and 39. The lower plate 39 is provided with a series of substantially identical equally spaced slots 41 defined by transverse fins or teeth 42, so that the structure resembles a gear rack. The upper plate 37 may be similarly corrugated, or may be smooth, as shown. A shield 43 of generally U-shaped cross section extends over the plate 37 and is connected to and closed at the bottom by the plate 39.

The coaxial input line 35 has its outer conductor connected to the shield 43, and its inner conductor connected to the edge of the plate 37. Signals applied to the line 35 set up fields between the conductors 37 and 39 which travel as waves longitudinally of the structure.

Fig. 10 is a graph of frequency as a function of the reciprocal $$\frac{1}{\lambda_g}$$

of wavelength $\lambda_g$ on a propagating structure. In a simple parallel plate transmission line without any loading (and without conductive side walls, so that it does not have the low frequency cutoff characteristic of an enclosed wave guide), the wavelength $\lambda$ and frequency $f$ are related in the same manner as in the propagation of waves in free space:

$$f=\frac{c}{\lambda}$$

where $c$ is the velocity of light. This is represented in Fig. 10 by the straight line 51, which has the slope $c$ at every point.

Now consider a line like that formed by the plates 37 and 39. Let $s$ be the distance between corresponding points on adjacent teeth 42 (i.e. $s$ is the period of the loading) and let $h$ be the depth of the slots 41, or the height of the teeth 42. The characteristic of such a line is shown by the curve 53 in Fig. 10; at low frequencies, the reciprocal guide wavelength and the frequency are linearly proportional, and the propagation velocity, as shown by the slope of the line, is $c$, the same as that of an unloaded line.

As the frequency is increased, approaching the quarter-wave resonance of the slots 41, i.e. the frequency at which the free space wavelength is four times the slot depth $h$, the slots introduce more inductive reactance in series along the line, and more energy is stored per unit volume for a given amount of power transmitted. The group velocity $v_g$ is the velocity with which energy travels along the line. The transmitted power is the product of the group velocity and the energy density. Therefore, as the stored energy per unit power per unit volume increases, the group velocity decreases.

In Fig. 10, the group velocity at any particular frequency is represented by the slope of the curve 53 at the respective point; for example at the point 55, the group velocity $v_g$ is the slope of the tangent line 57. As the quarter wave resonant frequency $$\frac{c}{4h}$$

is approached, the group velocity approaches zero and the curve 53 departs from the line 51, becoming asymptotic to the horizontal at $$\frac{c}{4h}$$

The reciprocal guide wavelength increases rapidly, approaching infinity ($\lambda_g=0$) at resonance. However, transmission along the line ceases abruptly at some lower frequency, when the guide wavelength becomes equal to $2s$. At this point, the slot spacing $s$ is one half wavelength, and destructive interference takes place between the reflections from successive slots. This is indicated in Fig. 10 where the line 53 is broken where the reciprocal guide wavelength is more than $2s$, beyond the point 61.

Since the phase velocity $v_p$ on the structure of Fig. 9 varies as a function of frequency over a certain range, the device is dispersive, somewhat like the helix of Fig. 7. Thus the arrangement of Fig. 9 can be operated substantially like that of Fig. 7, by designing the slot depth $h$ and the slot spacing $s$ according to the desired operating frequency range. Electrons moving synchronously with the phase fronts, i.e. at the velocity $v_p$, are subjected to respective unidirectional fields, either up or down, during their passage along the line. Some are deflected up, some down, and some not at all, depending upon their positions relative to the moving wave. This makes the electron beam thicker along longitudinal elements where the electrons are synchronous with the wave, and provides indications like those shown in Fig. 8. Non-synchronous electrons see alternating fields only, so that the net deflections of such elements of the stream are substantially zero.

In general, the acceptance band of the structure of Fig. 9 when operated as described above in the vicinity of the point 55 in Fig. 10, will be somewhat less than that of a helix such as that of Fig. 7. Much wider bands may be covered, with the incidental advantage of lower phase velocities and hence lower electron acceleration potentials, by designing the device of Fig. 9 to operate on a space harmonic.

Space harmonics result from the fact that in a periodic structure like the parallel plate line of Fig. 9, the electric fields are more concentrated in the regions between the plat 37 and the ends of the teeth 42, than in the regions between the plate 37 and the slots 41. Suppose a wave to be travelling along the line with a relatively high phase velocity, so that any particular phase front passes over many of the teeth 42, for example 20 of them, during one radio frequency cycle. Then the guide wavelength $\lambda_g$ is $20s$, and the phase velocity $v_p$ is $20sf$. An electron moving synchronously with this phase front would remain in a unidirectional field, as described above in reference to the operation of Fig. 9.

Now consider an electron moving much more slowly, so that it travels only the distance $d$ during the time (slightly more than one R.F. cycle) that the phase front travels $21s$. Let this electron be in one of the high field intensity regions adjacent one of the teeth 42 when the phase front is passing it, for example at an instant when the electric field is at a maximum from the plate 37 to this particular tooth 42. One half cycle later the electron is overtaken and passed by an oppositely directed phase front, with the electric field going from the bottom plate 39 toward the top plate 37. But now the electron is in one of the low field intensity regions adjacent a slot 41. The first downwardly directed phase front is followed at a distance $20s$ by a second, similar one, which overtakes the electron just as it passes through the next high intensity region adjacent the next tooth 42.

Thus, as the electron travels along the line, it encounters a field which alternates between a high intensity maximum in one direction (downward, in this example) and a low intensity maximum in the other direction. This is equivalent to a net unidirectional field, with an alternating field superimposed on it. The unidirectional component is, as far as the electron is concerned, exactly like the one in which it would be if it were moving at the phase velocity of the wave, $20sf$. In effect, there is a wave travelling synchronously with the electron, at a phase velocity $v'_g$ which is $$\frac{1}{21}$$

the phase velocity $v_g$ of the fundamental. This relatively much slower wave is the first space harmonic. By similar reasoning, the existence of a series of further higher order space harmonics can be deduced.

From the foregoing, it can be seen that the guide wavelength of the first space harmonic is $$\lambda'_g=\lambda_g\frac{s}{\lambda_g+s}$$

where $\lambda_g$ is the guide wavelength of the fundamental. The reciprocal guide wavelength is therefore $$\frac{1}{\lambda'_g}=\frac{\lambda_g+s}{s\lambda_g}=\frac{1}{\lambda_g}+\frac{1}{s}$$

Thus the reciprocal guide wavelength of the first space harmonic at any frequency is $$\frac{1}{s}$$

more than that of the fundamental at that frequency. This is represented in Fig. 10 by the line 65, which is exactly like the line 53, but displaced from it along the abscissa by the amount $$\frac{1}{s}$$

The phase velocity $v'_g$ of the space harmonic wave at any frequency is indicated in Fig. 10 by the slope of a line, such as the line 67, drawn from the origin to the point on the curve 65 which corresponds to that frequency. It is apparent that $v'_g$ varies with frequency throughout most of the band from zero frequency up to $$\frac{c}{4h}$$

where slot resonance occurs. Note that $v'_g$ increases with increasing frequency, unlike the fundamental dispersion, which is caused by slot resonance effects. The maximum value of $v'_g$ occurs near $$f=\frac{c}{4h}$$

and is about equal to $$\frac{c}{4h} \text{ divided by } \frac{3}{2s}$$

or $$\frac{cs}{6h}$$

Since space harmonic operation of the device of Fig. 9 does not depend very much upon slot resonance effects, the depth $h$ of the slots 41 is not critical, as long as it is great enough to provide the required alternate strong field and weak field regions. The slot spacing $s$ is determined by the frequency range to be covered, and the range of electron velocities to be used. It is evident that almost any desired conditions can be met, up to the point where the slot spacing $s$ becomes so small as to cause difficulties in fabrication. The indications produced by the device of Fig. 9 when designed to use a space harmonic are of the same type as those shown in Fig. 8 and the operation is substantially the same as with the fundamental mode of operation, except as noted above.

Fig. 11 shows a modification of the invention which may be substantially identical with the device of Fig. 9, except for the electron gun. In this case the electron gun includes a cathode 71 in the shape of a sector of a cylinder with its axis perpendicular to the plates 37 and 39 and offset near one edge of the plates, as shown. The cathode 71 is adapted to be heated indirectly by means of a heater or filament 73. An accelerating electrode 75, which may also be of partially cylindrical section, is disposed between the cathode 71 and the parallel plate line 37, 39, and is provided with an aperture which opens through an angle sufficient to expose the cathode to a fan-like area between the plates 37 and 39, as indicated by the dash lines 77 and 79.

In the operation of Fig. 11, the electrons in the fan-shaped beam all have substantially the same speed $u_0$ radially from the electron gun. Accordingly, the beam velocity longitudinally of the wave propagating structure along the line 77 is $u_0$. The longitudinal component of velocity of electrons moving along the line 79 is $$u_1=u_0 \cos \phi$$

where $\phi$ is the angle of the line 79 with respect to the direction of wave propagation. Thus, although the electrons all leave the gun with substantially the same velocity, they will synchronize with waves of different frequencies (and phase velocities), producing indications substantially of the type shown in Fig. 8. It will be apparent that the arrangement of Fig. 11 has the advantage of using a unipotential cathode, and avoids the necessity for a high resistance filament or the equivalent. However, the electron gun of Fig. 11 is somewhat like a point source, so that higher emission density is required for a given beam intensity at the screen 5'.

Figure 12:
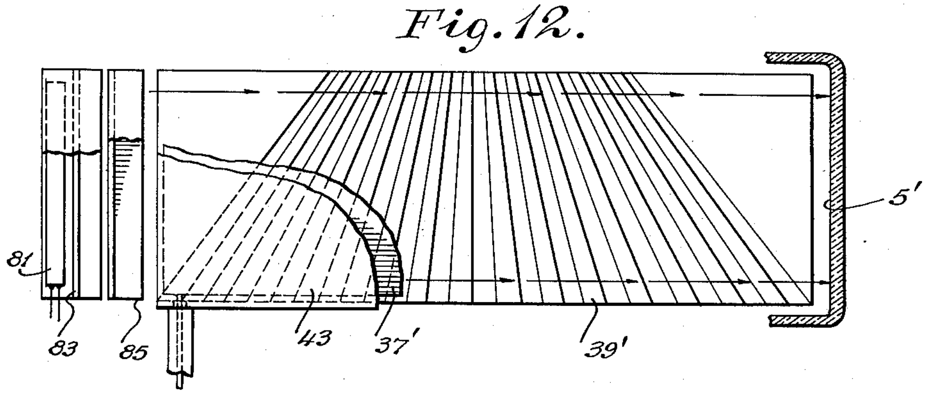
Figure 13:
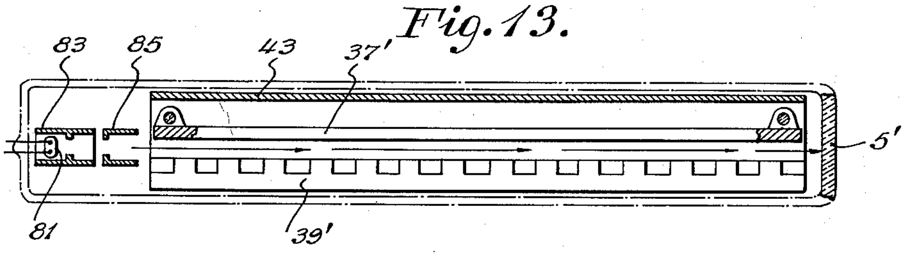
Figure 14:
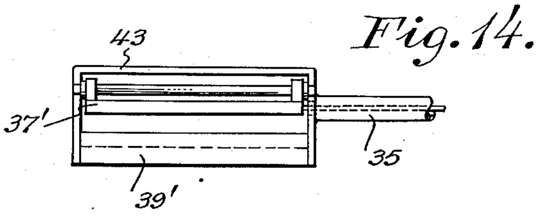

In the modification shown in Figs. 12 through 14, the electron gun includes a strip or linear cathode 81, adapted to be indirectly heated by an internal filament, not shown, a focussing electrode 83 adjacent the cathode, and an accelerator electrode 85, designed to produce a flat sheet or ribbon shaped beam in which all the electrons are of substantially the same velocity. The wave propagating structure includes parallel plates 37' and 39' similar to the plates 37 and 39 of Figs. 9 and 11, except that the rack arrangement of alternate teeth and slots is tapered as shown in Fig. 12, so that the loading period (slot spacing) varies from a relatively small value $s_1$ at one side of the line to a larger value $s_2$ at the other side. Other than the electron gun and the tapered rack, the device of Fig. 12 may be the same as those of Figs. 9 and 11.

Either fundamental or space harmonic waves may be used in the operation of Fig. 12. In either case, the phase velocity for any given signal frequency will vary as a function of lateral position across the line. Since the electrons all have the same velocity, they will synchronize with the wave substantially only along one lineal longitudinal element of the stream, and the lateral position of this element will depend upon the frequency. As in the previously described operation of the structures of Figs. 7, 9, and 11, the electrons are deflected to produce indications at corresponding points on the screen 5', as illustrated in Fig. 8.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An instantaneous frequency indicator, including a slow wave propagating structure which is dispersive throughout the range of frequencies with which the device is to operate, said structure having a surface of substantial extent transversely of the direction of wave propagation thereon, means for applying signals whose frequencies are to be measured to one end of said structure, an electron gun adjacent said end of said structure comprising a filamentary cathode substantially conforming to an end elevation of said surface and an accelerator electrode between said filament and said surface, said filament being adapted to be heated by direct current to make the potential difference between said electrode and said filament vary according to position along said filament and thus produce a sheet-like beam of electrons conforming to said surface and flowing along said surface at velocities which depend upon the positions of their points of emission from said filament, and a fluorescent screen adjacent the end of said structure remote from said gun, said screen being positioned to receive said beam after its passage along said structure and adapted, upon excitation by said beam, to produce a luminous display comprising a line corresponding generally to an image of said filament but deformed at points excited by electrons which move along said surface with velocities substantially equal to the phase velocities of the travelling waves produced on said structure by said input signals.

2. A spectrum analyzer for high frequency electromagnetic wave energy, comprising a frequency dispersive slow wave propagating structure for conducting waves substantially along a linear path with phase velocities which depend upon the frequencies of the waves and which are low compared to the velocity of wave propagation in free space, means for producing a beam of electrons and directing said beam along said path in energy interchanging relationship with waves travelling on said propagating structure, said beam having a major cross sectional dimension and a minor cross sectional dimension relatively small with respect thereto, the relationship between the phase velocity versus frequency characteristic of said structure and the velocity of any lineal longitudinal element of said beam being a function of the position of such element along said major cross sectional dimension.

3. A spectrum analyzer for high frequency electromagnetic wave energy, comprising a frequency dispersive slow wave propagating structure for conducting waves substantially along a linear path with phase velocities which depend upon the frequencies of the waves and which are low compared to the velocity of wave propagation in free space, means for producing a beam of electrons and directing said beam along said path in energy interchanging relationship with waves travelling on said propagating structure, said beam having a major cross sectional dimension approximately the same as a corresponding dimension of said wave propagating structure and a minor cross sectional dimension relatively small with respect thereto, the relationship between the phase velocity versus frequency characteristic of said structure and the velocity of any lineal longitudinal element of said beam being a function of the position of such element along said major cross sectional dimension, and means responsive to a deflection of an element of said beam transversely of said major dimension to indicate frequency in terms of the position of said element along said major dimension.

4. The invention as set forth in claim 3, wherein said wave propagating structure comprises two substantially parallel conductive plates constituting a transmission line, at least one of said plates being provided with a series of slots on its surface facing the other of said plates, said slots being substantially uniformly spaced apart along the direction of wave propagation on said line, and extending transversely to said direction.

5. The invention as set forth in claim 4, wherein the depth of said slots is less than one quarter the free-space wavelength of the lowest frequency to be indicated by the system.

6. The invention as set forth in claim 4, wherein said means for producing said electron beam comprises a cathode adjacent a lateral edge of said propagating structure near one end thereof, and an accelerating electrode between said cathode and said structure, said accelerating electrode including an aperture which exposes said cathode to a fan-like sector of said structure.

7. A spectrum analyzer for high frequency electromagnetic wave energy, comprising a wave propagating structure having the characteristic of conducting waves with phase velocities which are low compared to the velocity of light and are variable according to the frequency of said waves, said structure having a surface of substantial extent transversely of the direction of wave propagation thereon, means for producing an electron beam of approximately the same transverse extent as said surface and projecting said beam along said structure in the direction of wave propagation thereon in proximity to said surface, the velocity of each different lineal element of said beam corresponding to the phase velocity of waves on the adjacent lineal element of said propagating structure at a respective frequency, and means responsive to modulation of an element of said beam by a wave travelling on said structure to indicate the frequency of said wave in terms of the transverse position of said element in said beam.

8. An instantaneous frequency indicator, including a conductive helix which is dispersive throughout the range of frequencies with which the device is to operate, means for applying signals whose frequencies are to be measured to one end of said helix, an electron gun adjacent said end of said helix comprising a filamentary cathode substantially confronting in outline to a portion of the transverse cross section of said helix and an accelerator electrode between said filament and said helix, said filament being adapted to be heated by direct current to make the potential difference between said electrode and said filament vary according to position along said filament and thus produce a sheet-like beam of electrons conforming to the surface of said helix and flowing along said surface at velocities which depend upon the positions of their points of emission from said filament, and a fluorescent screen adjacent the end of said helix remote from said gun, said screen being positioned to receive said beam after its passage along said helix and adapted, upon excitation by said beam, to produce a luminous display comprising a line conforming generally to the outline of said filament but deformed at points excited by electrons which move along said helix with velocities substantially equal to the phase velocities of the travelling waves produced on said helix by said input signals.

9. The invention as set forth in claim 8, wherein said helix is of oblong cross section, and said electron gun is designed to project said electron beam along the inside of said helix adjacent an interior surface thereof.

10. An instantaneous frequency indicator, including a conductive helix which is dispersive throughout the range of frequencies with which the device is to operate, means for applying signals whose frequencies are to be measured to one end of said helix, and electron gun adjacent said end of said helix arranged to produce a sheet-like beam of electrons conforming to the surface of said helix and flowing along said surface at axial velocities which depend upon their positions with respect to a transverse cross section of said helix, and a fluorescent screen adjacent the end of said helix remote from said gun, said screen being positioned to be excited by said beam after its passage along said helix to produce a luminous display comprising a line which is deformed at points excited by electrons which move along with said helix with velocities substantially equal to the phase velocities of the travelling waves produced on said helix by said input signals.

11. A spectrum analyzer for high frequency electromagnetic wave energy, comprising a wave propagating structure having the characteristic of conducting waves with phase velocities which are low compared to the velocity of light and are variable according to the frequency of said waves, said structure having a surface of substantial extent transversely of the direction of wave propagation thereon, means at one end of said structure for producing a beam of electrons travelling along said structure and in close proximity thereto, indicating means at the other end of said structure extending along said surface and responsive to impingement thereon by said beam to indicate at each point along said indicating means the extent of impingement transverse to said surface, each different lineal element of said beam impinging on said indicator at a different point thereof and having a velocity corresponding to the phase velocity of waves on the adjacent lineal element of said propagating structure at a certain different frequency.

References Cited in the file of this patent

UNITED STATES PATENTS

| | | |
|---|---|---|
| 2,064,469 | Haeff | Dec. 15, 1936 |
| 2,535,317 | Pierce | Dec. 26, 1950 |

OTHER REFERENCES

Kompfner-Proceedings of the I.R.E., vol. 35, February 1947, pages 124–127 (Fig. 1), 179–171–18.

Traveling Wave Tubes (Pierce), published by D. Van Nostrand Company, Inc., New York 1950. Page 60 relied on.

A Spatial Harmonic Traveling-Wave Amplifier For Six Millimeter Wavelength-Millman-Proceedings of the I.R.E., vol. 39, pages 1035–1043, September 1951. 179–171–18.